J. DAVIS.
Broadcast Seeder.
No. 50,916. Patented Nov 14. 1865.
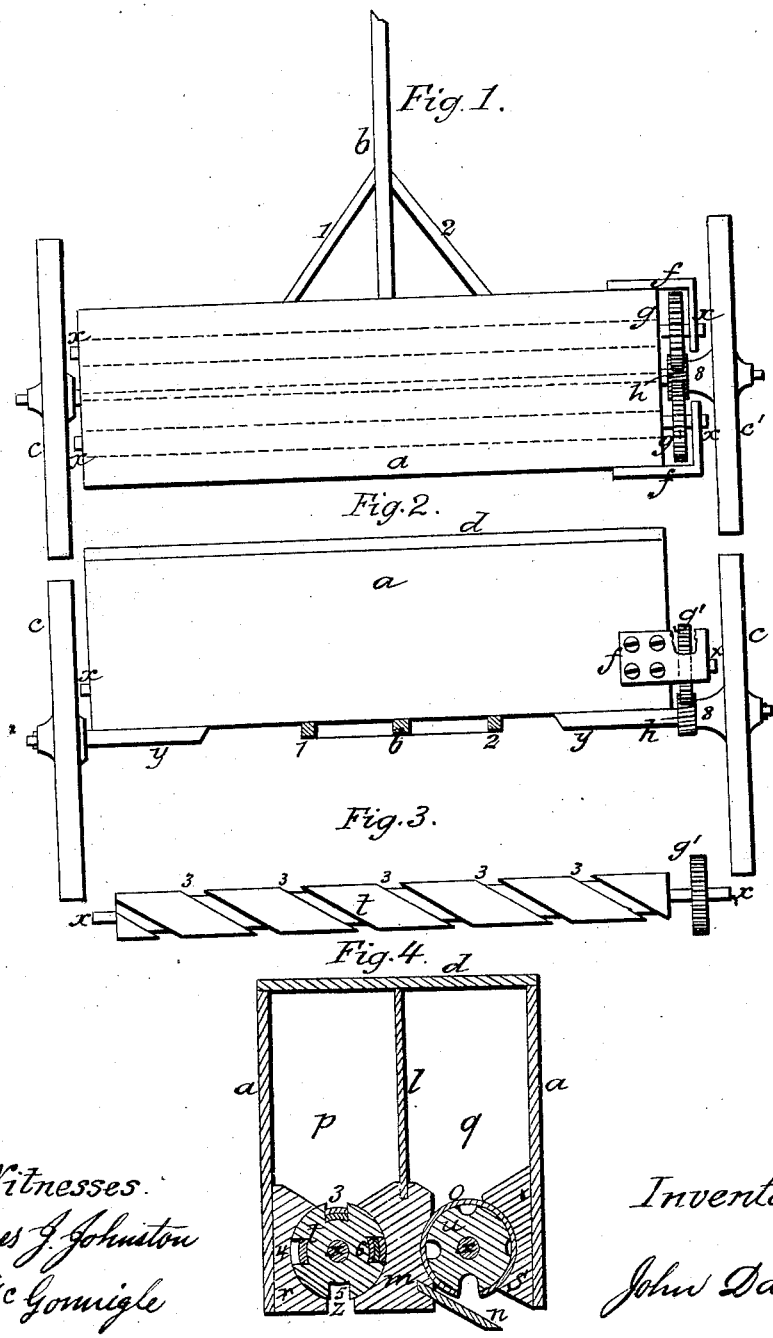
Witnesses
James J. Johnston
M. McGonigle
Inventor
John Davis

UNITED STATES PATENT OFFICE.

JOHN DAVIS, OF ALLEGHENY CITY, PENNSYLVANIA.

IMPROVEMENT IN BROADCAST-SEEDERS.

Specification forming part of Letters Patent No. 50,916, dated November 14, 1865; antedated November 5, 1865.

*To all whom it may concern:*

Be it known that I, JOHN DAVIS, of the city and county of Allegheny, in the State of Pennsylvania, have invented a new and useful Improvement in Broadcast - Sowers; and I do hereby declare that the following is a full and exact description thereof, reference being had to the accompanying drawings, and to the letters of reference marked thereon.

The nature of my invention consists in an arrangement for regulating the capacity of seed-cells of seed-rollers by the use of strips of gum or leather placed in a groove or grooves made in the rollers for the purpose of forming said seed-cells, which arrangement of rollers, grooves, and strips, in their connection with the hopper and operating-gear, will prevent the seed from breaking or smashing, the whole being constructed, arranged, and operating in the manner hereinafter described.

To enable others skilled in the art of making broadcast-sowers to make and use my invention, I will proceed to describe its construction and operation.

In the accompanying drawings, Figure 1 represents a top view of my improvement in broadcast-sowers. Fig. 2 represents a back end elevation of the same. Fig. 3 represents a face or side view of a seed-roller furnished with a series of grooves or one spiral groove, in which is placed a gum or leather strip, or a series of strips. Fig. 4 represents a transversed section of the hopper.

In the drawings, $a$ represents the hopper or seed-chamber, which is divided into two compartments by means of a division-piece, (marked $l$,) so as to form two seed-chambers, which are marked $p$ and $q$. In the bottom part of the hopper $a$ are secured pieces marked $r$, $m$, and $s$, which are constructed and arranged so that they form chambers for the seed-rollers $t$ and $u$, as represented in Fig. 4. The axles (marked $x$) of the rollers $t$ and $u$ have their bearings in one end of the hopper $a$ and in the pieces marked $f$. On the axles $x$ are secured cog-wheels marked $g$ and $g'$, which gear into the wheel marked $h$, which is secured to the inner end of the hub 8 of the wheel marked $c'$. The axles $y$ of the wheels $c$ and $c'$ are secured to the bottom of the hopper $a$, to which is also secured the tongue (marked $b$) and its braces 1 and 2.

The seed-roller (marked $u$) is furnished with a number of series of seed-cells, which vary in size. This roller is placed within a sheath made of thin sheet metal, which sheath is marked $o$, and furnished with a single series of openings which correspond in size and position to the size and position of the cells in the roller. By this arrangement of seed-cells in the roller, in combination with its sheath $o$, any desired quantity of seed can be sown, for each series of seed-cells in the roller vary in capacity, and there being but a single series of openings in the sheath $o$, all the seed-cells will be covered but the one series desired for sowing. This arrangement of sheath $o$ and seed-roller $u$, with its cells of various capacity, is clearly shown in Fig. 4.

The seed-roller $t$ is furnished with a groove or grooves which run spirally and lengthwise of the roller, and are made deep and wide enough to sow the largest quantity of seed which may be required in sowing. In this groove or grooves (which is marked 3 in Fig. 3) I place strips of gum or soft leather, which are secured in the grooves by means of set-screws or other suitable means. These strips of gum or soft leather are used for the purpose of forming flexible bottoms in the grooves, and thereby prevent the breaking and crushing of the seed. The strips also answer for the purpose of diminishing and increasing the depth, and therefore the capacity, of the groove or grooves for sowing.

The manner of increasing or diminishing the depth of the grooves is clearly shown in Fig. 4 in the roller marked $t$, in which the groove marked 6 is represented as being entirely filled up with strips of gum or soft leather. Groove marked 5 is represented without strips in it. Groove marked 4 is represented with one strip in it, and groove marked 3 is represented with two strips in it.

The operation of my improvement is as follows: Having all things constructed and arranged as herein described, I place the seed I desire to sow broadcast in the chambers $p$ and $q$ of the hopper $a$, and the revolving of the wheel $c'$ will revolve the wheel $h$ on its hub 8, which will revolve the wheels $g$ and $g'$, which will revolve the rollers $t$ and $u$, so that the roller $t$ will carry the seed around and let it drop through opening $z$, and roller $u$ will carry around the seed and drop it on the distributing-board marked n.

The roller can be made operative or inoperative by means of suitable shifting-levers or other device.

It will be observed that by the use of two chambers and two rollers in the hopper a two different kinds of seed can be sown at one time, which is often very desirable, for farmers often sow broadcast oats and timothy-seed in the same field.

Having thus described the nature, construction, and operation of my improvement, what I claim as my invention is—

The use of gum or soft-leather strips placed in the grooves of seed-rollers used in connection with a hopper, and driving-gear for operating said rollers, substantially as herein described, and for the purpose set forth.

JOHN DAVIS.

Witnesses:
JAMES J. JOHNSTON,
ALEXANDER HAYS.